United States Patent
Böhm et al.

(10) Patent No.: US 8,200,394 B2
(45) Date of Patent: Jun. 12, 2012

(54) SYSTEM AND METHOD FOR ADJUSTMENT OF A STEER ANGLE OF A WHEEL OF A MOTOR VEHICLE

(75) Inventors: Jürgen Böhm, Oberneisen (DE); Steffen Linkenbach, Eschborn (DE); Norman Muth, Frankenberg (DE)

(73) Assignee: Continental Teves AG & Co. oHG (DE)

(*) Notice: Subject to any disclaimer, the term of this patent is extended or adjusted under 35 U.S.C. 154(b) by 359 days.

(21) Appl. No.: 12/517,128

(22) PCT Filed: Nov. 30, 2007

(86) PCT No.: PCT/EP2007/063079
§ 371 (c)(1),
(2), (4) Date: Jun. 1, 2009

(87) PCT Pub. No.: WO2008/068200
PCT Pub. Date: Jun. 12, 2008

(65) Prior Publication Data
US 2010/0057291 A1    Mar. 4, 2010

(30) Foreign Application Priority Data

Dec. 4, 2006  (DE) .................. 10 2006 057 360
Dec. 4, 2006  (DE) .................. 10 2006 057 363
Nov. 30, 2007  (DE) .................. 10 2007 058 143

(51) Int. Cl.
*B62D 6/00*    (2006.01)
(52) U.S. Cl. .............. 701/41; 701/29.2; 701/43
(58) Field of Classification Search .............. 701/33, 701/41, 29.2, 43
See application file for complete search history.

(56) References Cited

U.S. PATENT DOCUMENTS 5,292,149 A      3/1994  Luger
2001/0030075 A1*  10/2001 Furumi et al. .............. 180/412

FOREIGN PATENT DOCUMENTS

| DE | 40 20 547 A1 | 1/1992 |
| DE | 198 33 460 A1 | 1/2000 |
| DE | 102 11 809 A1 | 5/2003 |
| DE | 10 2006 020 487 A1 | 11/2006 |
| DE | 10 2006 020 041 A1 | 3/2007 |
| EP | 1 394 016 A | 3/2004 |
| EP | 1394016 A1 * | 3/2004 |
| EP | 1 512 609 A | 3/2005 |
| EP | 1512609 A1 * | 3/2005 |
| WO | WO 2006/117343 A | 11/2006 |
| WO | WO 2006117343 A1 * | 11/2006 |

* cited by examiner

*Primary Examiner* — Paul N Dickson
*Assistant Examiner* — Robert A Coker
(74) *Attorney, Agent, or Firm* — RatnerPrestia

(57) ABSTRACT

A system for adjusting a wheel lock angle of a wheel of a motor vehicle, in particular of a rear wheel, wherein at least one wheel guide member, by means of which a wheel carrier of the wheel is connected to a vehicle body, wherein the wheel carrier can pivot about a rotational axis which runs substantially parallel to the plane of the wheel and the wheel guide member is coupled to the wheel carrier at a distance from the rotational axis, and wherein the length of the wheel guide member can be adjusted by an actuator, wherein at least one actuator is driven by a motor and at least one control unit, and the control unit includes a computer unit with a memory and a communication interface, and the control unit transmits and receives data via the communication interface by means of at least one communication bus.

12 Claims, 3 Drawing Sheets

SYSTEM AND METHOD FOR ADJUSTMENT OF A STEER ANGLE OF A WHEEL OF A MOTOR VEHICLE

CROSS REFERENCE TO RELATED APPLICATIONS

This application is the U.S. national phase application of PCT International Application No. PCT/EP2007/063079, filed Nov. 30, 2007, which claims priority to German Patent Application No. DE102006057363.3, filed Dec. 4, 2006, German Patent Application No. DE102006057360.9, filed Dec. 4, 2006, and German Patent Application No. DE102007058143.4, filed Nov. 30, 2007, the contents of such applications being incorporated by reference herein.

BACKGROUND OF THE INVENTION

1. Field of the Invention

The invention relates to the field of rear wheel steering and relates, in particular, to a system for adjusting a wheel lock angle of a wheel of a motor vehicle, and to a method for adjusting a wheel lock angle of a wheel of a motor vehicle.

2. Description of the Related Art

Known steering devices for a rear wheel steering system have, in a similar way to conventional front axle steering systems, a track rod which connects the right-hand and left-hand rear wheels to one another. A wheel lock angle is adjusted here by electromechanically or electrohydraulically controlled displacement of the track rod. However, such steering devices require a considerable degree of structural complexity.

German laid-open patent application DE 40 20 547 A1 discloses a device for adjusting the wheel lock angle of the rear wheels, in which device a track rod and a wheel guide link are held on a wheel carrier by means of a tilting lever element. The track rod is connected via a lever to a piston rod of a hydraulic actuator element which controls pivoting of the wheel. However, this device requires a specific wheel suspension system, which also results in a considerable degree of structural complexity.

In order to integrate a steering device for adjusting a wheel lock angle of a wheel of a motor vehicle, in particular of a rear wheel, into a conventional wheel suspension system, DE 102005020396 discloses a steering device which comprises at least one wheel guide member by means of which a wheel carrier of the wheel is connected to a vehicle body, wherein the wheel carrier can pivot about a rotational axis which runs essentially parallel to the plane of the wheel, and the wheel guide member is coupled to the wheel carrier at a distance from the rotational axis. The length of the wheel guide member can be adjusted here by means of a drive unit.

SUMMARY OF THE INVENTION

An object of the invention is to adjust a wheel lock angle of a wheel of a motor vehicle in a more reliable fashion and to assume a safe state in the event of a fault in the steering system.

In one embodiment of the system for adjusting a wheel lock angle of a wheel of a motor vehicle, in particular of a rear wheel, wherein at least one wheel guide member, by means of which a wheel carrier of the wheel is connected to a vehicle body, the wheel carrier can pivot about a rotational axis which runs essentially parallel to the plane of the wheel, the wheel guide member is coupled to the wheel carrier at a distance from the rotational axis, and the length of the wheel guide member can be adjusted by means of an actuator, is characterized in that at least one actuator is driven directly and/or indirectly by a motor 30 and at least one control unit 10, 80, 81, and the control unit comprises a computer unit with a memory and at least one wire-bound communication interface, and the respective control units transmit and receive data by means of the communication interface and at least one communication bus. The track rods are driven by means of rear wheel steering control devices (RWS control devices) 80, 81 to which the track rods 70, 71 are each in principle connected via an electronic interface. In the text which follows, the term RWS control device (RWS=Rear Wheel Steering) will be used for the rear wheel steering device 80, 81.

One advantageous embodiment of the system according to aspects of the invention is characterized in that the system has an ESP control device 10 as a first control unit and two RWS control devices 80, 81 as a second and third control device, wherein the RWS control devices 80, 81 are of modular design and have means for acquiring local sensor variables 30, 32, 40, 42, 50, 52, 60, 62 of the actuators.

In one particularly advantageous embodiment of the inventive system, the two RWS control devices 80, 81 are connected directly to one another by crosscoupling by means of switches 140, 150, 141, 151, and in the event of a fault within an RWS functionality the RWS control devices 80, 81 switch one another off, and the RWS control devices 80, 81 drive the actuators in such a way that stepped deactivation of the system is carried out. Furthermore, according to aspects of the invention the stepped deactivation of the system has at least two steps.

In a further advantageous embodiment, an RWS control unit 80, 81 acquires the motor angle $\phi_{Mot}$, the track rod displacement X, a motor torque $M_{Mot}$, a motor current $I_{Mot}$ of the motor (30, 32), a vehicle velocity $V_{Vehicle}$, driver steering angle of the front axle $\delta_{driver}$ (15b) and correction steering angle $\Delta\delta_{ESP}$ (15c) which is assigned to the respective wheel.

A further advantageous embodiment of the system is characterized in that the ESP control device 10 monitors the RWS control devices 80, 81 and in the event of a fault within an RWS functionality said ESP control device 10 switches off the RWS control devices 80, 81 by means of the switches 140, 150, 141, 151.

According to aspects of the invention, a method is provided for adjusting a wheel lock angle of a wheel of a motor vehicle. If a fault occurs in a steering actuation system 90, 91, the method detects this fault by means of the RWS control devices 80, 81.

In one advantageous embodiment of the method according to aspects of the invention, if a fault is detected in a steering actuation system (90, 91), the RWS control devices (80, 81) carry out stepped deactivation of the system, wherein the stepped deactivation of the system has at least two steps and the RWS control devices 80, 81 switch one another off and switch off the steering actuation system.

One particularly advantageous embodiment of the method according to aspects of the invention is characterized in that when a fault is detected, the ESP control device 10 carries out stepped deactivation of the system, wherein the stepped deactivation of the system has at least two steps, and the ESP control device 10 carries out the RWS control devices 80, 81 and switches off the steering actuation system 90, 91.

In a further particularly advantageous embodiment of the method according to aspects of the invention, a fault is detected by the RWS control devices 80, 81 monitoring one another or by monitoring by the ESP control device, wherein the monitoring is carried out by checking the data transmitted via a databus 110, and a function code is processed on the monitoring control device and is compared with the function code of the control device which is to be monitored.

DESCRIPTION AND ADVANTAGES OF THE INVENTION

The function of the rear wheel steering system has already been described in DE 102006020041 which was submitted by the applicant and whose content is a component of the application. The wheel-specific steering movement of the two rear wheels is brought about here by means of a track rod, which can be adjusted electromechanically by means of two electromotors, of the rear wheel integral carrier.

An exemplary embodiment of the invention is illustrated in the drawings and will be described in more detail in the text which follows.

DETAILED DESCRIPTION OF THE PREFERRED EMBODIMENTS

Figure 1:
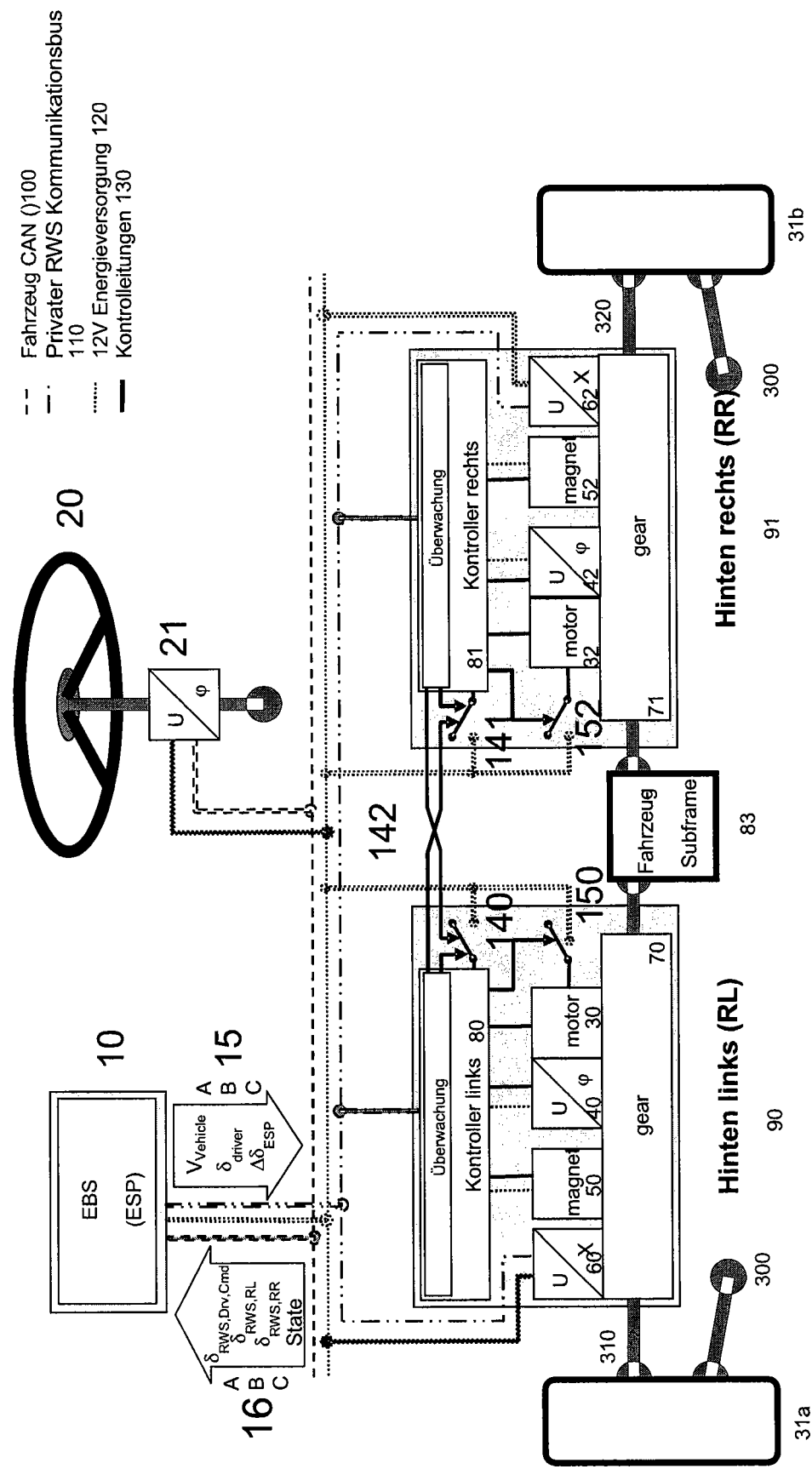
FIG. 1 shows the system architecture for the driving of the rear wheel steering system with the RWS control devices monitoring one another.

FIG. 1 is a schematic illustration, viewed from the viewing direction of the rear of a four-wheeled motor vehicle with a left-hand rear wheel 31a and a right-hand rear wheel 31b. The rear wheels 31a, 31b are attached to the vehicle by means of a rear wheel carrier 300 (not shown in the drawing) which may be, for example, the rear wheel integral carrier disclosed in FIG. 1 of DE 102005020396. Each rear wheel 31a, 31b is assigned a track rod 70 and 71, each of which is a track rod 310/320 with an adjustable length. The track rods 310, 320 engage on the rear wheels 31a, 31b as illustrated schematically in the figure, so that said rear wheels 31a, 31b can pivot through an angle with respect to a pivot axis owing to changes in length of the track rods 70, 71.

Basically, the rear wheels 31a, 31b here can be deflected in the same direction or in opposing directions with respect to the steering movement of the front wheels. Deflection of the rear wheels 31a, 31b and of the front wheels in opposing directions causes the bend radius to be decreased while the steering angle at the front wheels remains the same, with the result that an increase in the maneuverability of the vehicle can be achieved. If the rear wheels 70, 71 are deflected in the same direction of rotation as the front wheels, the yaw rate of the vehicle decreases, with the result that the vehicle can be stabilized in critical driving situations.

The track rods are driven by rear wheel steering control devices (RWS control devices) 80, 81 to which the track rods 70, 71 are respectively connected via an electronic interface. In particular control instructions for driving the motors 30, 32 of the track rods 70, 71, on the one hand, and, on the other hand, signals from displacement sensors 60, 62, which sense the position of the driving rod within the housing of the track rod, can be transmitted via the interface. Within the RWS control devices 80, 81, the respective current wheel lock angle of the rear wheels 31a, 31b is determined from these signals. The two track rods 70, 71 constitute here independent modules which can be driven independently of one another, with the result that basically a freely selectable wheel lock angle can be set within the mechanical stops at each rear wheel 31a, 31b.

The driving is carried out by means of a control method as a function of different vehicle variables which are measured, in particular, using sensors 30, 32, 40, 42, 50, 52, 60, 62. Sensors of a vehicle movement dynamics control system, for example of an ESP (Electronic Stability Program) system 10, are preferably used to carry out the control method. Said system usually comprises a steering angle sensor 21 for acquiring the steering angle which the driver has set at the steerable front wheels (not shown) by means of a steering handle 20. Furthermore, the vehicle movement dynamics control system can receive and evaluate the setpoint and actual values for the wheel lock angle of the rear wheels and state information of the RWS control devices.

These signals are received and evaluated in an ESP control device 10. The ESP control device is usually integrated with an electrohydraulic unit for carrying out braking interventions in an assembly. In this context, the master brake cylinder of the hydraulic vehicle brake system is connected to the wheel brakes via the electrohydraulic unit. In this context, the brake pressure which is brought about by means of a brake activation device by the driver using the brake booster can be modified on a wheel-specific basis by means of electronically controllable valves. In addition, the hydraulic unit has a pressure increasing device with which braking interventions for stabilizing the vehicle can be performed independently of the driver, which braking interventions are controlled by the ESP control device by means of a control method which is known per se to a person skilled in the art.

In the embodiment of the invention illustrated in FIG. 1, an interface is provided for transmitting signals between the ESP control device and the RWS control devices 80, 81. The transmission of signals can be carried out here, for example, via a databus system such as the CAN (Controller Area Network) which is generally used in motor vehicles.

The interface is used to transmit the signals of the ESP sensor system to the RWS control devices 80, 81, which generate predefined setpoint values for the wheel lock angle of the rear wheels 31a, 31b and/or the lengths of the track rods 15a, 15b as a function of the sensor signals by means of a control method.

The driving of the two track rods 70, 71 with, in each case, one electric motor 30, 32 is carried out by means of an RWS control device 80, 81 which is assigned to the respective motor.

The two RWS control devices 80, 82 are connected to one another by means of a private databus 110. Furthermore, the ESP control device is connected to the two control devices via this databus. The databus can be implemented, for example, by means of CAN or Flex-Ray.

The two RWS control devices 80, 81 together implement the basic steering function for the rear wheel steering system with a variable steering transmission ratio and control or adjustment of the wheel lock angle of the rear wheels. The input information which is necessary to form the variable steering transmission ratio and which relates to the velocity of the vehicle and the steering angle which is adjusted by the driver at the front axle, that is to say the driver steering angle, are made available by the ESP control device 10 via the private databus 110. In addition, steering angle correction interventions on the basis of the vehicle movement dynamics control system are transmitted from the ESP control device 10 via the private databus 110 to the RWS control devices 80, 81 and have to be taken into account by the latter.

The two RWS control devices 80, 81 constitute simple computers which monitor one another for plausibility and satisfactory processing of functions. According to aspects of the invention, plausibility checking comprises carrying out checking to determine whether a specific value is associated with a specific type of data or is in a predefined value range or a predefined value set. This ensures that the method according to aspects of the invention satisfies the previously made dynamic requirements. The dynamic requirements are either specified in advance or they are learnt and correspondingly updated by means of a learning method.

When a fault which must result in switching off of the RWS control devices 90, 91 occurs and is detected, and as a result of the assumption of the safe state in which the electromechanical system is locked, each RWS control device 80, 81 can also disconnect itself from the power supply 120 by means of the switch 140 or 141 by assuming the corresponding switch position, and can in addition disconnect the second RWS control device from the power supply 120 via the switch 141. As a result, the RWS system and each of the two individual actuators change into the locked, and therefore safe state, in which the case the actuators are disconnected from the power supply via the switch 150 or 152, respectively. In principle, in this embodiment the RWS control devices 80, 81 are connected in crisscross fashion 142 and do not require any superordinate monitoring entity in order to go into the safe state.

Each RWS control device 80, 81 acquires, in the first embodiment according to FIG. 1, the local sensor variables motor angle $\phi_{Mot}$ 40, 42 and track rod displacement X 60, 62 as well as the motor current $I_{Mot}$ of the motor 30, 32 from which the motor torque $M_{Mot}$ can be determined.

Furthermore, the RWS control devices 80, 81 acquire the signals vehicle velocity $V_{Vehicle}$ 15a and driver steering angle of the front axle $\delta_{driver}$ 15b which are required for the variable steering transmission ratio function and evaluates them in addition to the correction steering angle $\Delta\delta_{ESP}$ 15c which is assigned to the wheel and is transmitted by the ESP control device as a result of the vehicle movement dynamics control process.

Each RWS control device 80, 81 calculates the variable steering transmission ratio (VSR). In this context, a steering angle $\delta_{RWS,Drv,Cmd}$ 16a is calculated here for the rear wheels on the basis of the velocity of the vehicle, driver steering angle and a steering transmission ratio function which is adapted to the vehicle. In one preferred embodiment, this function can be represented in the form of a characteristic curve or a characteristic curve diagram. Since the two RWS control devices 80, 81 receive the same input information and consider the same steering transmission ratio function, in the fault-free state the steering angle setpoint value which is considered is the same in both control devices.

The RWS control devices 80, 81 take into account the steering angle correction interventions $\Delta\delta_{ESP}$ 15c on the basis of the vehicle movement dynamics control process. As a result, a total setpoint value is acquired for the steering angle controller $\delta_{RWS,Cmd}=\delta_{RWS,Drv,Cmd}+\Delta\delta_{ESP}$ of the steering actuator which is considered. It is basically possible here for the aforementioned correction steering angle for the right-hand and left-hand actuators to be different or to be the same ($\delta_{RWS,Cmd,RR}=\delta_{RWS,Drv,Cmd}+\Delta\delta_{ESP,RR}$ and $\delta_{RWS,Cmd,RL}=\delta_{RWS,Drv,Cmd}+\Delta\delta_{ESP,RL}$). The abbreviations RR and RL stand for RR: rear right, right-hand actuator, RL: rear left, left-hand actuator.

The RWS control devices 80, 81 carry out the steering angle control of the electromechanical systems 70, 71, which are assigned to the RWS control device, on the basis of the determined setpoint values $\delta_{RWS,Cmd}$ and of the acquired signals for the motor angle $\phi_{Mot}$ 40, 42 and/or track rod displacement X 60, 62 which represent the steering angle actual value, and said electromechanical systems 70, 71 perform the driving of the motor with the determined manipulated variable (for example motor setpoint torque) of the steering angle control system and the monitoring of the input signals and of the actuator behavior for plausibility and satisfactory functioning.

Each RWS control device 80, 81 additionally monitors the satisfactory functioning of the RWS control device located opposite. To do this, the monitoring RWS control device additionally receives, via the private databus 110, the displacement information X 60a and 62a of the actuator to be monitored, directly from the sensor 60, 62, and—as a function of the defined monitoring method—further local sensor information, system states and the determined manipulated variable of the control device to be monitored, from this control device. On the basis of these input data, it is then checked whether the manipulated variables determined by the control device to be monitored, and system states and, if appropriate, further important intermediate results, are plausible or can be confirmed.

For this purpose, these data must additionally be transmitted via the already mentioned private databus 110. This checking can be carried out, for example, by again processing the same function code on this control device for the purpose of monitoring and comparing it with the data transmitted by the control device to be monitored. If deviations occur, or if the detected deviations lie outside a tolerance range, the fault is detected, which leads to the system being deactivated. Instead of the same function code there is also the possibility of using a reduced function code and plausibility checks, but this gives rise to an increased tolerance range.

The deactivation of the system is carried out in steps. In order to simplify the explanation it is assumed that the RWS control device 80 which is assigned to the left-hand steering actuator RWS_RL 90 has detected the presence of a fault. The right-hand steering actuator 91 is characterized below by RWS_RR.

In the first step of deactivation of the system (ordered system switch-off I), the steering actuator RWS_RL 90 has detected, in the components assigned to it, a fault which does not have any direct influence on the controllability and driving of the RWS_RL motor 30, such as for example implausible or faulty input data for the variable steering transmission ratio function. In this case, the RWS_RL actuator moves to the predefined passive position, which is defined, for example, by the straight-ahead position of the rear wheels and is locked there in an ordered fashion. At the same time, via the private databus 110 the actuator RWS_RR 91 is made, by means of a corresponding control instruction, to likewise adopt this position and also to lock the actuator in an ordered fashion after this position has been reached. The ordered locking includes here firstly locking the actuator after the target position has been reached and only then slowly reducing the motor torque to the value 0 Nm.

In the second step of deactivation of the system (immediate switching off of the affected actuator), RWS_RL 90 has detected, in the components assigned to it, a fault which can no longer ensure safe controllability and driving of the RWS_RL motor 30. In this case, the actuator is immediately switched off and the motor 30 and the locking system are de-energized. At the same time, via the private databus 110 the actuator RWS_RR 91 is made, by means of a corresponding control instruction, to adopt the actuator passive position, defined for this case, and to lock the actuator in an ordered fashion after this position has been reached. The actuator passive position can also be defined in this case by the straight-ahead position of the rear wheels or is defined in such a way that it is dependent on the position of the faulty actuator RWS_RL 90.

In the third step of deactivation of the system (switching off of the monitored control device), RWS_RL 90 has detected an implausible system behavior during the monitoring of the RWS_RR control device 81. This leads to switching off of the RWS_RR control device 81 by disconnection from the power supply by the RWS_RL control device 80. At the same time, the actuator RWS_RL 90 adopts the actuator passive position, which is defined for this case, and locks it after this position has been reached, as described above. If this predefined passive position is dependent on the position of the actuator RWS_RR 91, this information is available despite the control device being switched off, since it is available on the private databus 110.

Figure 2:
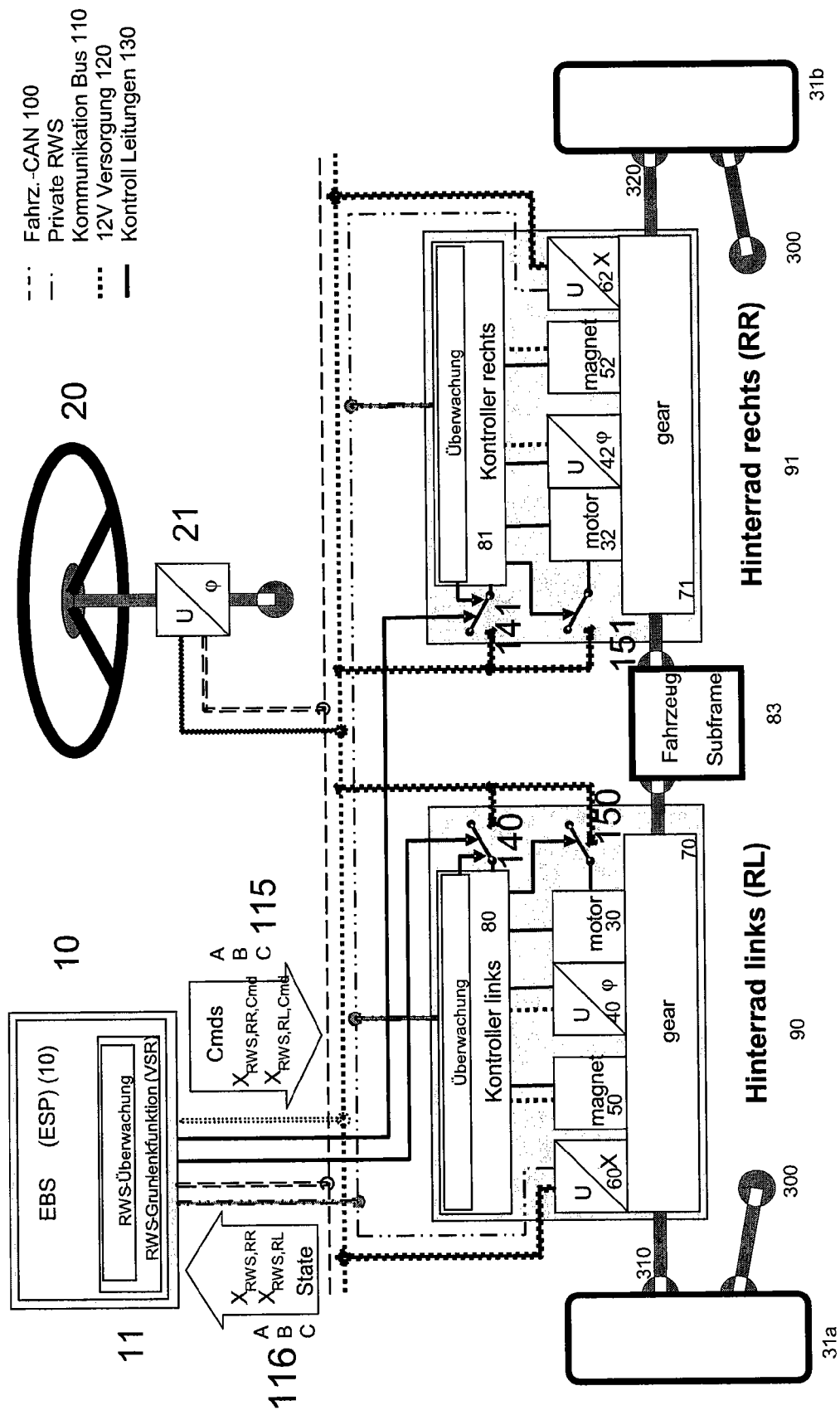
FIG. 2 shows the system architecture for the driving of the rear wheel steering system with a signal interface for the track rod displacement.

FIG. 2 shows a second embodiment of the system according to aspects of the invention for driving the rear wheel steering system. This embodiment of the system according to aspects of the invention comprises a decentralized system architecture in which parts of the basic functionality of the RWS control devices 80, 81 and the total system monitoring are arranged in the ESP control device 10 which is responsible for the vehicle movement dynamics control. It is also provided that these predefined setpoint values are determined in the ESP control device and transmitted via the interface to the RWS control devices 80, 81 which then drive the track rods 70, 71 in accordance with the predefined setpoint values.

The wheel-specific steering movement of the two rear wheels 31a, b is carried out here by means of a track rod 70, 71 of the rear wheel integral carrier, which track rod can, as already mentioned, be adjusted electromechanically by means of two electric motors 30, 32.

The driving of the two track rods 70, 71 with, in each case, one electric motor 30 or 32, respectively, is carried out by means of an RWS control device 80, 81 which is assigned to the respective motor. The two RWS control devices 80, 81 are connected to one another by means of a private databus 110. Furthermore, the ESP control device 10 is connected to the two RWS control devices 80, 81 via this private databus 110. The private databus 110 can be implemented, for example, by means of CAN. Alternatively, it is also possible to use further protocols which satisfy the requirements for transmission of the carrier sense multiple access/collision resolution (CSMA/CR).

The division of the functionality in this embodiment of the decentralized RWS system architecture is such that, in addition to the ESP function, the variable steering transmission ratio function for the rear wheel steering system and the monitoring of the RWS total system function are implemented in the ESP control device.

As is apparent from FIG. 2, when a fault which must result in switching off of the RWS 90, 91—which causes the safe state with a locked electromechanical system to be assumed—occurs and is detected the ESP control device 10 can disconnect the affected RWS control device 80, 81 or both RWS control devices 80, 81 from the power supply 120, and this is also referred to as a power shutoff. As a result, the RWS system 90 or 91, and therefore each of the two individual actuators, changes into the locked and therefore safe state.

The RWS control device 80, 81 which is assigned to the respective steering actuator implements the steering angle control for the actuator under consideration and therefore the control and/or adjustment of the wheel lock angle of the rear wheels, as well as a local functional monitoring system which is restricted to the actuator. This local monitoring comprises monitoring the subsystem assigned to it for plausibility, for example the input data and, if appropriate, intermediate values and the satisfactory processing of functions. When a fault which must result in switching off of the RWS actuator occurs, each RWS control device 80, 81 can switch itself off via the switches 140, 141. The two RWS control devices 80, 81 are simple computers which monitor themselves for plausibility and satisfactory processing of functions. In addition, functions are monitored by the ESP control device 10.

The sensors for the displacement of the track rod are also coupled directly to the private databus 110, with the result that in the case of a fault, such as for example both RWS control devices being de-energized, the ESP control device has the current track rod displacement information 116 a, b, c, which is important for the ESP function of the ESP control device 10 since these signals represent the wheel lock angle of the rear wheels.

The ESP control device 10 implements the function of the variable steering transmission ratio (VSR) for the rear wheels. The calculation of a steering angle $\delta_{RWS,Drv,Cmd}$ for the rear wheels is carried out on the basis of the signals vehicle velocity, driver steering angle and a steering transmission ratio function which is adapted to the vehicle, said signals already being available in the ESP control device. In one preferred embodiment, this can be carried out by means of a characteristic curve or a characteristic curve diagram, which is stored by means of a table with corresponding values in the memory of the ESP control device.

Furthermore, the ESP control device 10 takes into account the steering angle correction intervention $\Delta\delta_{ESP}$ 15b on the basis of the vehicle movement dynamics control system which is implemented in the ESP control device 10. As a result, a total setpoint value for the steering angle controller $\delta_{RWS,Cmd}=\delta_{RWS,Drv,Cmd}+\Delta\delta_{ESP}$. It is basically possible here for the aforementioned correction steering angle for the right-hand and left-hand actuators to be different or the same ($\delta_{RWS,Cmd,RR}=\delta_{RWS,Drv,Cmd}+\Delta\delta_{ESP,RR}$ and $\delta_{RWS,Cmd,RL}=\delta_{RWS,Drv,Cmd}+\Delta\delta_{ESP,RL}$).

The ESP control device calculates and transmits the corresponding setpoint values for the track rod displacement 60 and 62 ($X_{RWS,Cmd,RR}$ and $X_{RWS,Cmd,RL}$) of the right-hand and left-hand rear wheel actuators taking into account the vehicle-specific axle kinematics which are defined in this case by the relationship between the track rod displacement and the wheel steering angle of the rear wheels, and said ESP control device monitors the satisfactory functioning of the two RWS control devices 80, 81.

In addition, the ESP control device receives, via the private databus 110, the displacement information X of the actuators to be monitored, directly from the sensor 60, 62 and—dependent on the defined monitoring strategy—further local sensor information on the RWS control devices 80, 81 to be monitored, from said control devices. On the basis of these input data it is checked whether the manipulated variables which are determined by the RWS control devices 80, 81 and the system states and, if appropriate, further important intermediate results are plausible and/or can be confirmed. For this purpose, these data are additionally transmitted via the already mentioned private databus 110. This checking can be carried out, for example, in that, for the purpose of monitoring, the same function code is processed once more on the ESP control device 10 and is compared with the transmitted data. If deviations occur or the detected deviations are outside a tolerance range, the fault is detected, which leads to deactivation of the system. In place of the same function code it is also possible to use a reduced function code and/or additional plausibility checks, and this gives rise to an enlarged tolerance range.

The signal interface (illustrated in FIG. 2) between the ESP control device 10 and the two RWS control devices 80, 81 is a displacement interface. The setpoint values for the actuator control therefore represent setpoint values for the track rod displacement which is to be set. The corresponding wheel lock angle is then obtained by means of the steering kinematics of the rear wheel axle. This displacement interface has the advantage that the actuator control which is used on the RWS control devices 80, 81 does not require special knowledge of the kinematics of the rear wheel and does not need any vehicle-specific information for processing of functions.

The RWS control devices 80, 81 according to FIG. 2 acquire the local sensor variables for the motor angle $\phi_{Mot}$, track rod displacement X and the motor current $I_{Mot}$ of the motor 30, 32 from which the motor torque $M_{Mot}$ can be determined, and they acquire the track rod displacement setpoint value ($X_{RWS,Cmd,RR}$ for RWS-RR and $X_{RWS,Cmd,RL}$ for RWS-RL, respectively) which is relevant for the steering actuator and is transmitted by the ESP control device 10.

By means of the RWS control devices 80, 81, the track rod displacement of the electromechanical system 70 which is assigned to the respective RWS control device is controlled on the basis of the setpoint values which are determined and transmitted by the ESP control device 10, and the sensed signal for the motor angle $\phi_{Mot}$, which represents the track rod displacement, or of the directly measured track rod displacement X.

The RWS control devices 80, 81 drive the motors with the determined manipulated variables (for example motor setpoint torque) of the control system for the track rod displacement and monitor the input signals and the actuator behavior for plausibility and for satisfactory processing of functions. During occurrence and processing. When a fault occurs and is detected, the RWS actuator is deactivated by the RWS control devices 80, 81.

The detailed switching off strategy will now be considered in more detail.

The deactivation of the system is carried out again in steps, as in exemplary embodiment 1, and it additionally depends on which control device is bringing it about. For the sake of a simplified explanation, it is firstly assumed that the RWS control device 80 which is assigned to the left-hand steering actuator (RWS_RL) has detected the presence of a fault. The same also applies, of course, to the opposite case in which the RWS control device 81 which is assigned to the right-hand steering actuator (RWS_RR) has detected the presence of a fault.

In the first step of the deactivation of the system (ordered system switch-off II), the steering actuator RWS_RL 80 has detected a fault in the components assigned to it, which fault does not have any direct influence on the controllability and driving of the RWS_RL motor, for example implausible input data. In this case, the RWS_RL actuator moves to the predefined passive position such as, for example, the straight-ahead position of the rear wheel and is locked there in an ordered fashion. At the same time, the ESP control device 10 is informed about this, via the private databus 110, via a corresponding status message such as "state" signal, 16, 116, 216. By means of a corresponding control command, "Cmds" signal, the ESP control device then causes the actuator RWS_RR 91 also to adopt this position and also to lock the actuator in an ordered fashion after this position has been reached. The ordered locking includes here that after the target position has been reached the actuator is firstly locked and only then is the motor torque of the motor 32 slowly decreased to the value 0 Nm.

In the second step of deactivation of the system (immediate switching off of the affected actuator), the RWS_RL 90 has detected, in the components assigned to it, a fault which can no longer ensure safe controllability and driving of the RWS_RL motor 30. In this case, the actuator is switched off immediately, and the motor and locking system are therefore de-energized. At the same time, the ESP control device 10 is informed about this via the private databus 110 by means of a corresponding status message. The ESP control device then causes the actuator RWS_RR 91 to adopt the actuator passive position which is defined for this case and to lock the actuator in an ordered fashion after this position has been reached. If the faulty RWS control device 80, 81 is no longer able to transmit the corresponding status message, the ESP control device 10 can detect the deactivation of the control device from the absence of the messages which are transmitted cyclically via the private databus 110.

In a third step of deactivation of the system by the ESP control device 10, the ESP control device 10 has detected a fault or an implausible system behavior or implausible data records during the monitoring of the RWS total function 90, 91. If this does not have any direct influence on the controllability of the actuator under consideration, the two RWS actuators are caused to switch off in an ordered fashion by means of a corresponding control command. After the passive position which is predefined for this has been reached, it is possible, if necessary, for the ESP control device 10 to switch off the two RWS control devices via the switches 140, 141, 150, 151. If the detected fault or the implausibility is such that safe controllability and/or driving of one of the two actuators can no longer be ensured, this leads to a power shutoff of the RWS control device which is detected as being faulty, by the ESP control device 10 which simultaneously causes, by means of a corresponding control command, the actuator which is identified as being still functionally capable, to adopt the actuator passive position which is defined for this case and to lock after it has reached this position, as described above. If this predefined passive position is dependent on the position of the actuator which has already been switched off, this information is available despite the control device being switched off, since said information is available on the private databus 110.

Figure 3:
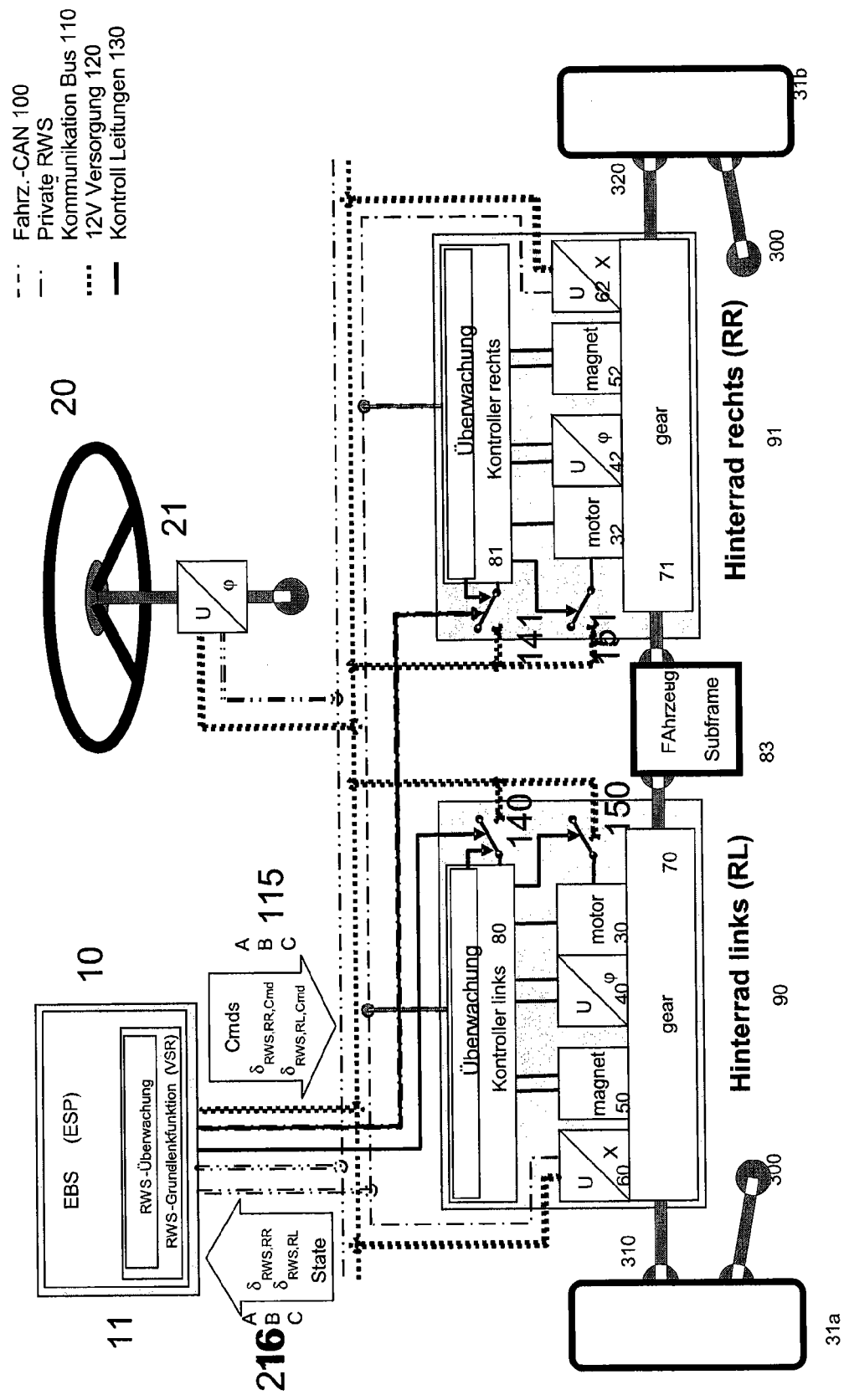
FIG. 3 shows the system architecture for the driving of the rear wheel steering system with a signal interface for the wheel steering angles.

As already mentioned, a displacement interface was considered in FIG. 2 as a signal interface between the ESP control device 10 and the two RWS control devices 80, 81. Basically, it is also possible for this signal interface to be implemented by means of a steering angle interface. FIG. 3 shows a corresponding arrangement.

The setpoint values for the actuator control then represent setpoint values for the wheel lock angle which is to be set at the rear wheels ($\delta_{RWS,Cmd,RR}$ for RWS_RR and $\delta_{RWS,Cmd,RL}$ for RWS_RL, respectively). In contrast to the description of FIG. 1, it now becomes apparent that the calculation of the corresponding setpoint values for the track rod displacement can be eliminated from the ESP control device unless this information is required for monitoring purposes.

In the RWS control devices 80, 81 a steering angle control process takes place in which, in order to determine the wheel lock angle on the basis of the signals representing the actual steering angle, the motor angle $\phi_{Mot}$ and/or track rod displacement X, knowledge is required of the axle kinematics which are present and which are defined in this case by the relationship between the track rod displacement and the wheel steering angle of the rear wheels. Therefore, vehicle-specific information is required on the RWS control devices for the processing of functions.

Consideration has also been given to setting up the wire-bound bus connections, in particular the private bus connection 110, via correspondingly broadband mobile communication connections by means of short-range communications such as Bluetooth. As a result, a wireless personal area network (WPAN) is set up in the vehicle, allowing distances between 0.2 and 50 m to be covered. For this purpose, an additional interface for transmitting and receiving the data is installed at each control device 10, 80, 81, and this interface is constructed in such a way that it is retrofitted onto an existing system architecture.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A system for adjusting a wheel lock angle of a wheel of a motor vehicle wherein at least one wheel guide member, by means of which a wheel carrier of the wheel is connected to a vehicle body, wherein the wheel carrier is configured to pivot about a rotational axis which extends substantially parallel to a plane of the wheel of the vehicle, and the wheel guide member is coupled to the wheel carrier at a distance from the rotational axis, and wherein a length of the wheel guide member is configured to be adjusted by an actuator,
wherein at least one actuator is driven by a motor and at least one control unit, and the control unit comprises a computer unit with a memory and at least one wire-bound or mobile communication interface, and the control unit transmits and receives data via the communication interface and at least one communication bus,
wherein the system has an Electronic Stability Program (ESP) control device as a first control unit and two rear wheel steering (RWS) control devices as a second and third control device, wherein the RWS control devices are of modular design and have means for acquiring local sensor variables of the actuators, and
wherein the two RWS control devices are connected directly to one another by crosscoupling by means of switches, and in the event of a fault within an RWS functionality the RWS control devices monitor one another and switch one another off, and the RWS control devices drive the actuators in such a way that stepped deactivation of the system is carried out.

2. The system as claimed in claim 1,
wherein the stepped deactivation of the system has at least two steps.

3. The system as claimed in claim 1,
wherein an RWS control unit acquires a motor angle $\phi_{Mot}$, a track rod displacement X, a motor torque $M_{Mot}$, a motor current $I_{Mot}$ of the motor, a vehicle velocity $V_{vehicle}$, and a driver steering angle of a front axle $\delta_{driver}$.

4. The system as claimed in claim 1,
wherein the ESP control device acquires and evaluates a correction steering angle $\Delta\delta_{ESP}$ which is assigned to a respective wheel.

5. The system as claimed in claim 1,
wherein the ESP control device monitors the RWS control devices, and, in the event of a fault within an RWS functionality, said ESP control device switches off the RWS control devices by means of the switches.

6. A method for adjusting a wheel lock angle of a wheel of a motor vehicle,
wherein if a fault occurs in a steering actuation system, the fault is detected by means of the RWS control devices of claim 1.

7. The method as claimed in claim 6,
wherein a fault is detected by the RWS control devices monitoring one another or by monitoring by the ESP control device, wherein the monitoring is carried out by checking the data transmitted via a databus, and a function code is processed on a monitoring control device and is compared with a function code of the control device which is to be monitored.

8. The method as claimed in claim 6,
wherein a vehicle velocity $v_{vehicle}$ is read in by the control devices via a controller area network (CAN) bus.

9. The system as claimed in claim 1,
wherein the wheel of the motor vehicle is a rear wheel.

10. The system as claimed in claim 1,
wherein the at least one actuator is driven directly, indirectly, or both directly and indirectly by a motor.

11. A system for adjusting a wheel lock angle of a wheel of a motor vehicle wherein at least one wheel guide member, by means of which a wheel carrier of the wheel is connected to a vehicle body, wherein the wheel carrier is configured to pivot about a rotational axis which extends substantially parallel to a plane of the wheel of the vehicle, and the wheel guide member is coupled to the wheel carrier at a distance from the rotational axis, and wherein a length of the wheel guide member is configured to be adjusted by an actuator,
wherein at least one actuator is driven by a motor and at least one control unit, and the control unit comprises a computer unit with a memory and at least one wire-bound or mobile communication interface, and the control unit transmits and receives data via the communication interface and at least one communication bus,
wherein the system has an Electronic Stability Program (ESP) control device as a first control unit and two rear wheel steering (RWS) control devices as a second and third control device, wherein the RWS control devices are of modular design and have means for acquiring local sensor variables of the actuators,
wherein if a fault occurs in a steering actuation system, the fault is detected by means of the RWS control devices, and
wherein if a fault is detected in a steering actuation system, the RWS control devices carry out stepped deactivation of the system, wherein the stepped deactivation of the system has at least two steps and the RWS control devices switch one another off and switch off the steering actuation system.

12. A system for adjusting a wheel lock angle of a wheel of a motor vehicle wherein at least one wheel guide member, by means of which a wheel carrier of the wheel is connected to a vehicle body, wherein the wheel carrier is configured to pivot about a rotational axis which extends substantially parallel to a plane of the wheel of the vehicle, and the wheel guide member is coupled to the wheel carrier at a distance from the rotational axis, and wherein a length of the wheel guide member is configured to be adjusted by an actuator,
wherein at least one actuator is driven by a motor and at least one control unit, and the control unit comprises a computer unit with a memory and at least one wire-bound or mobile communication interface, and the control unit transmits and receives data via the communication interface and at least one communication bus, wherein the system has an Electronic Stability Program (ESP) control device as a first control unit and two rear wheel steering (RWS) control devices as a second and third control device, wherein the RWS control devices are of modular design and have means for acquiring local sensor variables of the actuators, wherein if a fault occurs in a steering actuation system, the fault is detected by means of the RWS control devices, and wherein when a fault is detected, the ESP control device carries out stepped deactivation of the system, wherein the stepped deactivation of the system has at least two steps, and the ESP control device switches off the RWS control devices and switches off the steering actuation system.

* * * * *